(12) United States Patent
Nakamura et al.

(10) Patent No.: US 7,737,978 B2
(45) Date of Patent: Jun. 15, 2010

(54) DISPLAY, DISPLAYING METHOD, INFORMATION RECORDING MEDIUM, AND PROGRAM

(75) Inventors: Daizaburo Nakamura, Minato-ku (JP); Yutaka Ito, Minato-ku (JP); Takeshi Okubo, Minato-ku (JP)

(73) Assignee: Konami Digital Entertainment Co., Ltd. (JP)

( * ) Notice: Subject to any disclaimer, the term of this patent is extended or adjusted under 35 U.S.C. 154(b) by 675 days.

(21) Appl. No.: 11/587,483

(22) PCT Filed: Apr. 27, 2005

(86) PCT No.: PCT/JP2005/008022
§ 371 (c)(1),
(2), (4) Date: Oct. 24, 2006

(87) PCT Pub. No.: WO2005/106802
PCT Pub. Date: Nov. 10, 2005

(65) Prior Publication Data
US 2007/0216679 A1    Sep. 20, 2007

(30) Foreign Application Priority Data
Apr. 29, 2004   (JP) ............................. 2004-163825

(51) Int. Cl.
*G06T 15/70* (2006.01)
(52) U.S. Cl. .................. 345/473; 345/419; 345/474; 345/664; 345/673; 345/958
(58) Field of Classification Search .............. 345/419, 345/473–474, 958
See application file for complete search history.

(56) References Cited
U.S. PATENT DOCUMENTS
5,947,823 A * 9/1999 Nimura .................. 463/32

6,664,965 B1 * 12/2003 Yamamoto et al. .......... 345/473
6,746,331 B1 * 6/2004 Saikawa et al. ............. 463/31
7,448,950 B2 * 11/2008 Matsumoto ................. 463/31

(Continued)

FOREIGN PATENT DOCUMENTS
EP    1067452 A    1/2001

(Continued)

OTHER PUBLICATIONS

Gamespot, Burnout Review, Nov. 2, 2001, Acclaim, [online], [retrieved from the Internet Dec. 9, 2009]. <URL:http://www.gamespot.com/ps2/driving/burnout/review.html> Paragraph 5.*

(Continued)

*Primary Examiner*—Xiao M Wu
*Assistant Examiner*—Phi Hoang
(74) *Attorney, Agent, or Firm*—Townsend and Townsend and Crew LLP

(57) ABSTRACT

To provide a display, etc. suitable for appropriately processing display in a case where it is expected, in three-dimensional graphics display, that a viewpoint will collide with an object, a storage unit (202) of a display (201) stores the coordinates of a viewpoint and an object in a virtual three-dimensional space, moving velocities, etc., an associating unit (203) associates a real time and a virtual time in the virtual three-dimensional space, a moving unit (204) calculates the coordinates of the viewpoint and object and moving velocities, etc. at the associated virtual time to update the values stored in the storage unit (202), a display unit (205) displays the state of the virtual three-dimensional space as observed from the viewpoint, and a determination unit (206) determines whether or not the viewpoint will collide with the object after a predetermined virtual threshold period elapses, and makes the elapse of the virtual time slower than the real time in a case where it is determined that a collision will occur.

5 Claims, 4 Drawing Sheets

U.S. PATENT DOCUMENTS

2003/0043154 A1    3/2003    Nimura et al.
2004/0104912 A1*   6/2004    Yamamoto et al. .......... 345/473
2004/0204239 A1*  10/2004    Saikawa et al. ............... 463/30

FOREIGN PATENT DOCUMENTS

| GB | 2044053 A | 10/1980 |
|----|-----------|---------|
| JP | 11-197357 | 7/1999 |
| JP | 2000-200361 | 7/2000 |
| JP | 2001-076185 | 3/2001 |

OTHER PUBLICATIONS

Farrow, "Need for Speed: Hot Pursuit 2," Electronic Arts, Oct. 18, 2002, [online], [retrieved from the Internet on May 5, 2009]. <URL:http://www.netjak.com/review.php/176. p. 2, paragraph 7.
European Search Report EP05737186 dated Jul. 11, 2008.
International Search Report PCT/JP2005/008022 dated Jun. 28, 2005, 1 page.

* cited by examiner

FIG.3
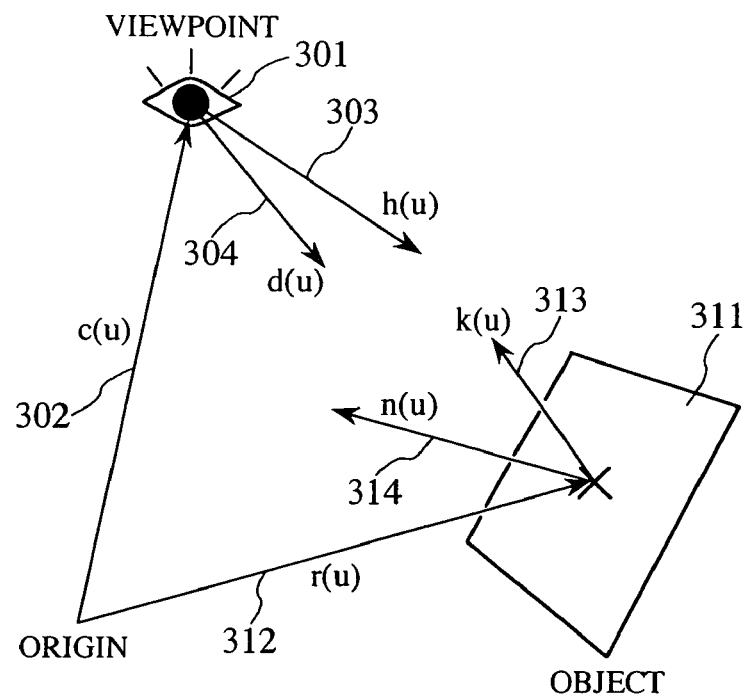
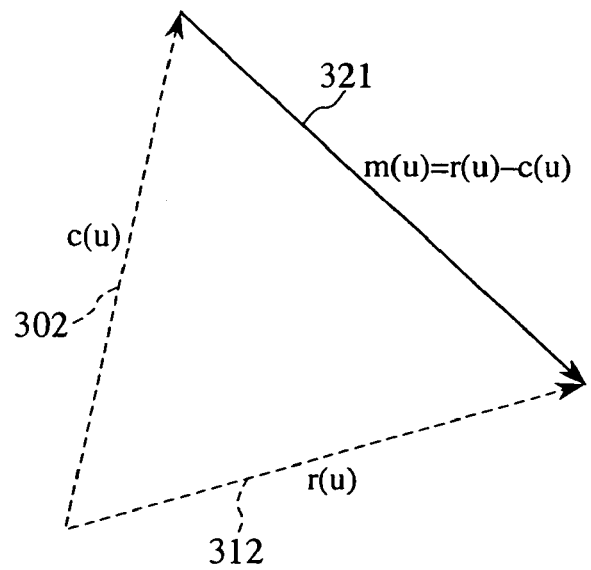
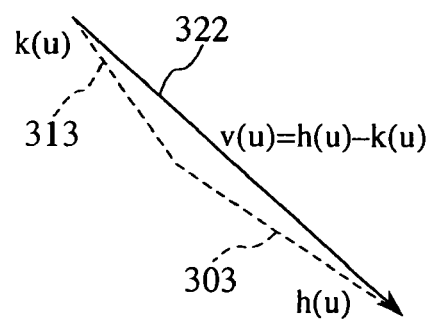

DISPLAY, DISPLAYING METHOD, INFORMATION RECORDING MEDIUM, AND PROGRAM

TECHNICAL FIELD

The present invention relates to a display and a displaying method suitable for appropriately processing display in a case where it is expected, in three-dimensional graphics display, that a viewpoint will collide with an object, and a computer-readable information recording medium storing a program for realizing these on a computer, and the program.

BACKGROUND ART

Conventionally, such techniques have been proposed, where a plurality of objects are placed in a virtual three-dimensional space, and with elapse of time in the virtual three-dimensional space taken into consideration, these objects are appropriately moved along with the elapse of time to try various simulations and to display, by three-dimensional graphics, the state of these objects as observed from a predetermined viewpoint along a predetermined sight line. Further, such techniques are also proposed, which change the position of the viewpoint and the sight line along which the three-dimensional space is observed along with the elapse of time, and such techniques typically include one that sets a viewpoint on any of the objects and sets the sight line along which the three-dimensional space is observed in a direction in which the set object moves, or one that sets such a sight line by the very sight line of the set object.

In such simulations, it is necessary to consider the collisions between the objects. The literature indicated below discloses a technique which detects a collision between characters in a three-dimensional game, in real time.

Patent Literature 1: Unexamined Japanese Patent Application KOKAI Publication No. H11-197357.

Conventionally, in screen display for such a collision, it has been considered necessary to perform processes in real time, by synchronizing the elapse of time in the virtual three-dimensional space and the elapse of time in the real world.

However, particularly, in a case where the shapes of the objects are varied or there are a large number of objects, the calculations become complicated and enormous if the calculations consist in accurately detecting the collision and accurately calculating the movements of the objects at the time of collision, and thus such calculations have been virtually impossible in some cases.

On the other hand, if the collision detection and the object's movements at the time of collision are calculated approximately, a so-called "polygon missing" or an otherwise impossible situation (for example, the viewpoint entering the inside of an object having no hollow, etc.) occurs and the displayed screen might be unnatural.

DISCLOSURE OF INVENTION

Problem to be Solved by the Invention

Hence, such a technique is demanded, which appropriately processes display at the time of such a collision, and notifies the collision to the user in an easy-to-understand manner.

The present invention was made to solve the above-described problem, and an object of the present invention is to provide a display and a displaying method suitable for appropriately processing display in a case where it is expected, in three-dimensional graphics display, that a viewpoint will collide with an object, and a computer-readable information recording medium storing a program for realizing these on a computer, and the program.

Means for Solving the Problem

To achieve the above object, the following invention will be disclosed according to the principle of the present invention.

A display according to a first aspect of the present invention comprises a storage unit, an associating unit, a moving unit, a display unit, and a determination unit, which are configured as follows.

That is, the storage unit stores coordinates of an object and a viewpoint arranged in a virtual three-dimensional space, a sight line vector representing a sight line along which the virtual three-dimensional space is observed from the viewpoint, and velocity vectors representing velocities at which the object and the viewpoint move in the virtual three-dimensional space.

Typically, the initial values of these values are recorded on a recording medium such as a DVD-ROM (Digital Versatile Disk Read Only Memory), etc., and these values are copied into a RAM (Random Access Memory) or a rewritable recording medium. And these values are updated where necessary, as will be described later.

Meanwhile, the associating unit associates a time (hereinafter referred to as "virtual time") in the virtual three-dimensional space with a time (hereinafter referred to as "real time") in a real world once in each predetermined update period.

Where the update period is a constant value A, updating is done as $t \leftarrow t+A$ (where "←" means substitution or value update), and the association between the real time t and the virtual time u is most simply like $u=t+C$ by using a constant value C. In this case, the state of the virtual three-dimensional space will be displayed in real time. According to the present invention, this association is changed, as will be described later.

Further, the moving unit obtains positions of the object and the viewpoint and a sight line along which the virtual three-dimensional space is observed from the viewpoint in the virtual three-dimensional space at the associated virtual time, and updates the coordinates of the object and the viewpoint, and the sight line vector stored in the storage unit.

Note that one of the viewpoint and the object may be stationary and the other may be stationary. For example, in a case where the present display is applied to a racing game, it is possible to make a vehicle object, which moves together with the viewpoint, move in the virtual three-dimensional space along with the elapse of the virtual time, while making the road surface on which the vehicle runs and objects such as a building, a wall, etc. that are placed on the road surface stand still in the virtual three-dimensional space.

Typically, information such as velocity vectors, etc. of the object and viewpoint, and information representing various conditions of constraint on the object and viewpoint (for example, a gravity is applied, an external force is applied, they are linked together and cannot be separated, etc.) are also stored in the storage unit, so that the acceleration may be obtained from the various conditions of constraints on the object, the velocity may be obtained from the acceleration, and the position may be obtained from the velocity.

The elapse of time in the virtual three-dimensional space in this case is obtained as the difference between the virtual time u which is currently associated, and the virtual time that was associated immediately before. In a case where the real time and the virtual time go through the same elapse as described above, this difference is the constant value A.

In this manner, the position r(u) of the object, the position c(u) of the viewpoint, and the sight line vector d(u) in the virtual three-dimensional space at the virtual time u associated with the current time t are obtained, and these are written into a predetermined area of the storage unit.

Then, the display unit displays, once in each the predetermined update period, an image representing a state of the object as observed from the viewpoint along a direction of the sight line vector in the virtual three-dimensional space at the associated virtual time.

Typically, the update period A is the vertical synchronization period (for example, about 1/60 second in case of an ordinary television set) of the screen. Hence, when an image is displayed at each this update period, the state of the object is displayed on the screen as animations.

Meanwhile, the determination unit determines whether or not the viewpoint and the object will collide before a threshold period in the virtual three-dimensional space elapses since a current time in the virtual three-dimensional space (hereinafter referred to as "within a virtual threshold period"), from the coordinates of the viewpoint, the coordinates of the object, and a velocity vector representing a relative velocity between the viewpoint and the object in the virtual three-dimensional space.

The determination here may check the collision between the objects accurately, or may use an approximating method as disclosed in [Patent Literature 1].

As other approximating methods, in a case where the object is stationary like a wall or a building, it is possible to use a technique where a velocity vector v(u) representing a relative velocity is obtained, and thereafter, with the use of a length P of the virtual threshold period, the difference between a vector Pv(u) and a vector r(u)-c(u) representing the current relative positional relationship between both the parties is within a predetermined range.

Further, the associating unit associates elapse of the virtual time with elapse of the real time such that they synchronize with each other until before it is determined that the viewpoint and the object will collide within the virtual threshold period, and associates them such that the elapse of the virtual time is slower than the elapse of the real time after it is determined that a collision will occur.

That is, in a case where it is turned out that the viewpoint and the object will collide in future within the virtual threshold period, the association by the associating unit is changed. For example, before it is turned out that a collision will occur, they are updated as $t \leftarrow t+A;$ $u \leftarrow u+A$ to make an association which satisfies a relationship $u = t + C,$ while after it is turned out that a collision will occur, they are updated as $t \leftarrow t+A;$ $u \leftarrow u+B$ by using a constant value B (B<A). The association between the real time t and the virtual time u is made by such updating.

Due to this, after it is turned out that a collision will occur, the animation display on the screen seem as if it were reproduced in slow motion until the collision actually occurs.

According to the present invention, it is possible to notify to the user that it is determined that the viewpoint will collide with the object in future, by slowing down the elapse of time in the virtual three-dimensional space and making the screen display in slow motion display.

Further, in the display according to the present invention, the storage unit may further store a normal vector which is orthogonal to an external surface of the object, and in a case where the object is stationary in the virtual three-dimensional space, the determination unit may determine that the viewpoint and the object will collide within the virtual threshold period, in a case where a route taken by the viewpoint within the virtual threshold period intersects the object, and at least any one of following conditions (a) an angle formed by the normal vector and the sight line vector is included in a predetermined first range, (b) an angle formed by the sight line vector and the velocity vector is included in a predetermined second range, and (c) an angle formed by the velocity vector and the normal vector is included in a predetermined third range is satisfied.

It is possible to employ any desired one from the combinations of the conditions (a), (b), and (c). For example, in a case where the angle formed by the sight line vector and the normal vector is close to 180 degrees and in a case where the sight line vector and the velocity vector are in almost the same direction (the formed angle is close to 0 degree), this corresponds to a situation that the viewpoint (or another object on which the viewpoint is set) and the object are to have a head-on collision.

According to the present invention, how a collision occurs is predicted beforehand by providing such conditions as described above, so that it may be possible to appropriately select whether to perform slow-motion reproduction or to show how the collision occurs in the normal reproduction, according to the prediction.

Further, in the display according to the present invention, the display unit may display the produced image and a predetermined moving image or a predetermined still image by crossfading them, after it is determined that a collision will occur.

For example, crossfading with a full black still image will make an animation display which combines slow motion and blackout, while crossfading with a full white sill image will make an animation display which combines slow motion and whiteout. Other than this, in a case where the object is broken, gas or liquid is blown out from the object, or the object explodes when the collision occurs, crossfading with an animation image showing the state of these may be employed.

Generally, in a case where a collision is determined approximately, an irregular display such as polygon missing, etc. occurs when the viewpoint becomes close to an object.

According to the present invention, even in a situation where such an irregular display will highly probably occur, it is possible to make the user stay unaware of such an irregular situation, by smoothly shifting the screen display to blackout, whiteout, explosion animation, etc., without greatly complicating the calculations.

Further, in the display according to the present invention, after it is determined that a collision will occur, the display unit may perform display by making an interval at which images to be displayed are produced longer than that before it is determined that a collision will occur.

According to the present invention, since the update time A is prolonged, it is possible to give an effect like that of a stop motion to the animation display until before the collision occurs and notify to the user that a collision will occur in a simple manner.

A displaying method according to another aspect of the present invention controls a display comprising a storage unit, an associating unit, a moving unit, a display unit, and a determination unit. The storage unit stores coordinates of an object and a viewpoint arranged in a virtual three-dimensional space, a sight line vector representing a sight line along which the virtual three-dimensional space is observed from the viewpoint, and velocity vectors representing velocities at which the object and the viewpoint move in the virtual three-dimensional space. The displaying method comprises an associating step, a moving step, a displaying step, and a determining step, which are configured as follows.

That is, at the associating step, the associating unit associates a time (hereinafter referred to as "virtual time") in the virtual three-dimensional space with a time (hereinafter referred to as "real time") in a real world once in each predetermined update period.

Meanwhile, at the moving step, the moving unit obtains positions of the object and the viewpoint and a sight line along which the virtual three-dimensional space is observed from the viewpoint in the virtual three-dimensional space at the associated virtual time, and updates the coordinates of the object and the viewpoint and the sight line vector stored in the storage unit.

Further, at the displaying step, the display unit displays, once in each the update period, an image representing a state of the object as observed from the viewpoint along a direction of the sight line vector in the virtual three-dimensional space at the associated virtual time.

Meanwhile, at the determining step, the determination unit determines whether or not the viewpoint and the object will collide before a threshold period in the virtual three-dimensional space elapses since a current time in the virtual three-dimensional space (hereinafter referred to as "within a virtual threshold period"), from the coordinates of the viewpoint, the coordinates of the object, and a velocity vector representing a relative velocity between the viewpoint and the object in the virtual three-dimensional space.

Further, at the associating step, elapse of the virtual time and elapse of the real time are associated such that they synchronize with each other until before it is determined that the viewpoint and the object will collide within the virtual threshold period, and they are associated such that the elapse of the virtual time is slower than the elapse of the real time after it is determined that a collision will occur.

A program according to another aspect of the present invention is configured to control a computer to function as the above-described display, or to control a computer to perform the above-described displaying method.

The program according to the present invention can be stored on a computer-readable information recording medium such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

Effect of the Invention

According to the present invention, it is possible to provide a display and a displaying method suitable for appropriately processing display in a case where it is expected, in three-dimensional graphics display, that a viewpoint will collide with an object, and a computer-readable information recording medium storing a program for realizing these on a computer, and the program.

BRIEF DESCRIPTION OF DRAWINGS

[FIG. 3] It is an explanatory diagram showing a relationship between a viewpoint and an object in a virtual three-dimensional space.

Figure 1:
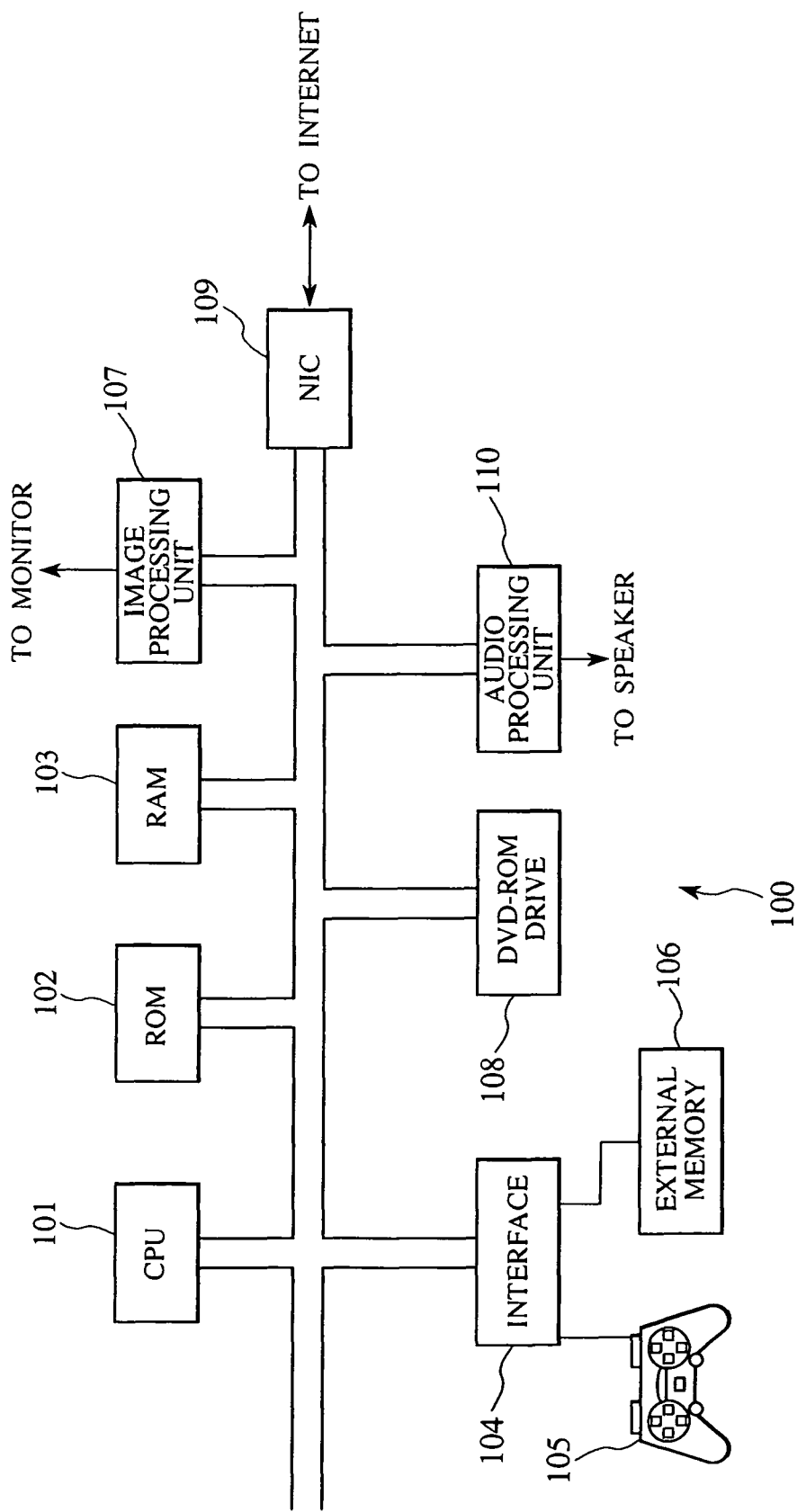
[FIG. 1] It is an explanatory diagram showing a schematic structure of a typical game device on which a display according to one embodiment of the present invention is realized.

EXPLANATION OF REFERENCE NUMERALS 100 game device
101 CPU
102 ROM
103 RAM
104 interface
105 controller
106 external memory
107 image processing unit
108 DVD-ROM drive
109 NIC
110 audio processing unit
201 display
202 storage unit
203 associating unit
204 moving unit
205 display unit
206 determination unit
301 viewpoint
302 position vector of the viewpoint
303 velocity vector of the viewpoint
304 sight line vector of the sight line
311 object
312 position vector of the object
313 velocity vector of the object
314 normal vector of the object
321 displacement vector representing a relative position from the viewpoint to the object
322 velocity vector representing a relative velocity from the viewpoint to the object

BEST MODE FOR CARRYING OUT THE INVENTION

The embodiments of the present invention will be explained below. Embodiments in which the present invention is applied to a game device on which three-dimensional graphics are displayed will be explained below in order to facilitate understanding. However, the present invention can likewise be applied to information processing apparatuses such as computers of various types, PDAs (Personal Data Assistants), portable telephones, etc. That is, the embodiments to be explained below are intended for explanation, not to limit the scope of the present invention. Accordingly, though those having ordinary skill in the art could employ embodiments in which each element or all the elements of the present embodiments are replaced with equivalents of those, such embodiments will also be included in the scope of the present invention.

Embodiment 1

FIG. 1 is an explanatory diagram showing a schematic structure of a typical game device on which a display according to the present invention will be realized. The following explanation will be given with reference to this diagram.

A game device 100 comprises a CPU (Central Processing Unit) 101, a ROM 102, a RAM 103, an interface 104, a controller 105, an external memory 106, an image processing unit 107, a DVD-ROM drive 108, an NIC (Network Interface Card) 109, and an audio processing unit 110.

By loading a DVD-ROM storing a game program and data onto the DVD-ROM drive 108 and turning on the power of the game device 100, the program will be executed and the display according to the present embodiment will be realized.

The CPU 101 controls the operation of the entire game device 100, and is connected to each element to exchange control signals and data. Further, by using an ALU (Arithmetic Logic Unit) (unillustrated), the CPU 101 can perform arithmetic operations such as addition, subtraction, multiplication, division, etc., logical operations such as logical addition, logical multiplication, logical negation, etc., bit operations such as bit addition, bit multiplication, bit inversion, bit shift, bit rotation, etc. toward a storage area, or a register (unillustrated), which can be accessed at a high speed. Further, the CPU 101 itself may be designed to be able to rapidly perform saturate operations such as addition, subtraction, multiplication, division, etc. for dealing with multimedia processes, vector operations such as trigonometric function, etc. or may realize these with a coprocessor.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire game device 100.

The RAM 103 is for temporarily storing data and programs, and retains the program and data read out from the DVD-ROM, and other data necessary for game proceedings and chat communications. Further, the CPU 101 performs processes such as securing a variable area in the RAM 103 to work the ALU directly upon the value stored in the variable to perform operations, or once storing the value stored in the RAM 103 in the register, performing operations toward the register, and writing back the operation result to the memory, etc.

The controller 105 connected through the interface 104 receives an operation input given by the user when playing a game such as a racing game, etc.

The external memory 106 detachably connected through the interface 104 rewritably stores data indicating the play status (past achievements, etc.) of a racing game, etc., data indicating the progress status of the game, data of chat communication logs (records), etc. The user can store these data on the external memory 106 where needed, by inputting instructions through the controller 105.

The DVD-ROM to be loaded on the DVD-ROM drive 108 stores a program for realizing a game and image data and audio data accompanying the game. Under the control of the CPU 101, the DVD-ROM drive 108 performs a reading process on the DVD-ROM loaded thereon to read out a necessary program and data, which are to be temporarily stored on the RAM 103, etc.

The image processing unit 107 processes the data read out from the DVD-ROM by means of the CPU 101 and an image calculation processor (unillustrated) provided in the image processing unit 107, and thereafter stores the data in a frame memory (unillustrated) provided in the image processing unit 107. The image information stored in the frame memory is converted into a video signal at a predetermined synchronization timing and output to a monitor (unillustrated) connected to the image processing unit 107. Thereby, image displays of various types are available.

The image calculation processor can rapidly perform transparent operations such as overlay operation or α blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position along a predetermined direction of sight line.

Further, by the CPU 101 and the image calculation processor working in cooperation, a character string as a two-dimensional image can be depicted on the frame memory, or depicted on the surface of each polygon, according to font information defining the shape of the characters.

The NIC 109 is for connecting the game device 100 to a computer communication network (unillustrated) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

The audio processing unit 110 converts audio data read out from the DVD-ROM into an analog audio signal, and outputs the signal from a speaker (unillustrated) connected thereto. Further, under the control of the CPU 101, the audio processing unit 110 generates sound effects and music data to be sounded in the course of the game, and outputs the sounds corresponding to the data from the speaker.

In a case where the audio data recorded on the DVD-ROM is MIDI data, the audio processing unit 110 refers to the music source data included in the data, and converts the MIDI data into PCM data. Further, in a case where the audio data is compressed audio data of ADPCM format, Ogg Vorbis format, etc., the audio processing unit 110 expands the data and converts it into PCM data. By D/A (Digital/Analog) converting the PCM data at a timing corresponding to the sampling frequency of the data and outputting the data to the speaker, it is possible to output the PCM data as audios.

Aside from the above, the game device 100 may be configured to perform the same functions as the ROM 102, the RAM 103, the external memory 106, the DVD-ROM to be loaded on the DVD-ROM drive 108, etc. by using a large-capacity external storage device such as a hard disk, etc.

Figure 2:
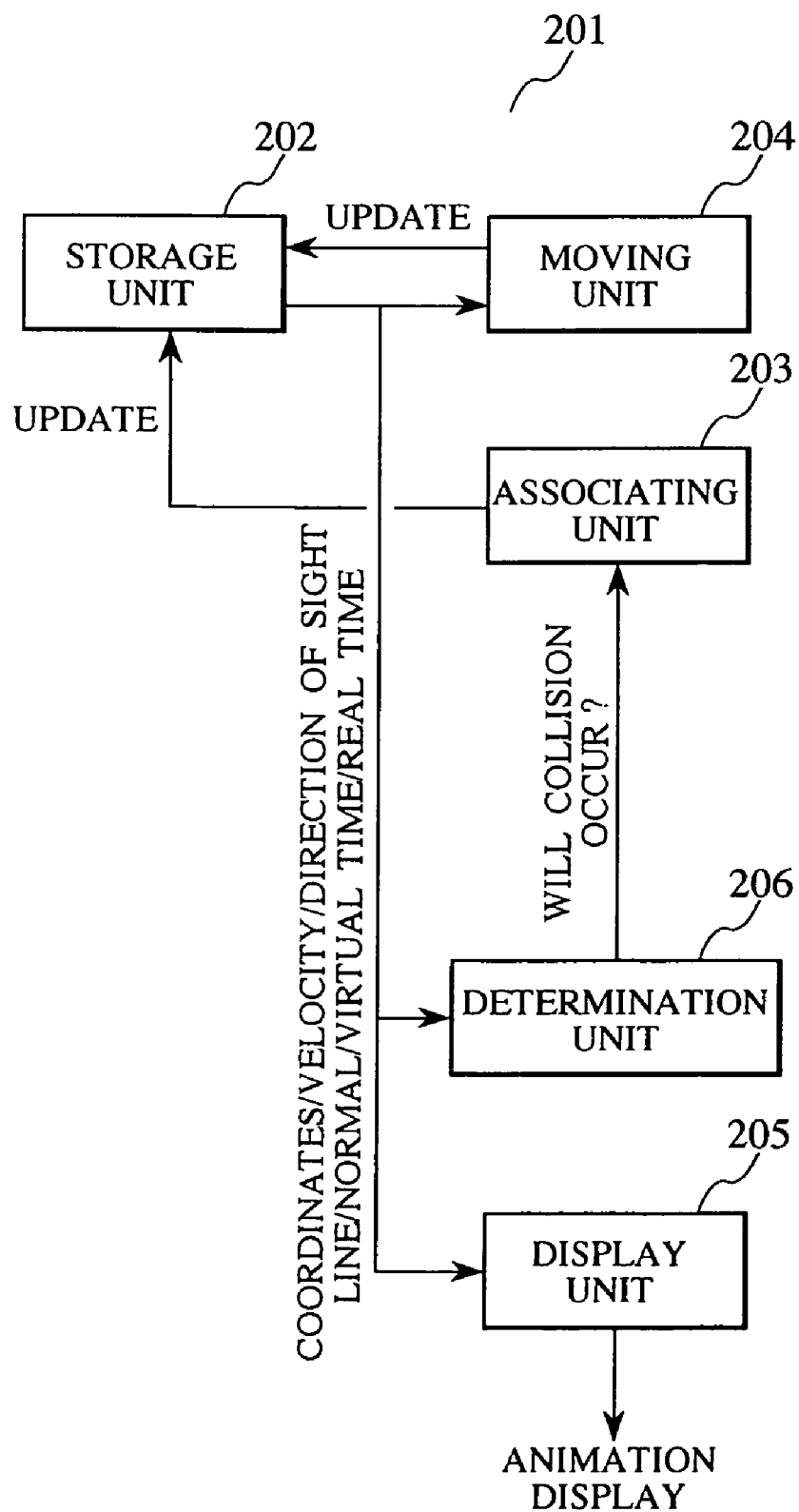
[FIG. 2] It is an exemplary diagram showing a schematic structure of the display according to one embodiment of the present invention.

FIG. 2 is an exemplary diagram showing a schematic structure of a display according to one embodiment of the present invention. The following explanation will be given with reference to this diagram.

The display 201 according to the present embodiment comprises a storage unit 202, an associating unit 203, a moving unit 204, a display unit 205, and a determination unit 206.

Here, the storage unit 202 stores the following information.

(1) coordinates (position vector) of objects arranged in a virtual three-dimensional space (2) vectors representing the velocity at which the objects move (3) normal vectors of the objects (4) coordinates (position vector) of a viewpoint arranged in the virtual three-dimensional space (5) a vector representing the velocity at which the viewpoint moves (6) a sight line vector representing the sight line along which the virtual three-dimensional space is observed from the viewpoint (7) conditions of constraint on the objects Here, as the conditions of constraint on the objects, it is possible to adopt the mass or inertia moment of the objects, that objects are linked, an external force such as gravity, frictional force, etc. applied to the objects.

Further, it is also possible to adopt a mode in which the viewpoint is set on any of the objects and moves together with that object, and its sight line vector has a predetermined angle from the sight line (normal vector) of that object.

Hence, the RAM 103 of the game device 100 functions as the storage unit 202. The initial values of these values are such values as loaded from the DVD-ROM as described above, or found beforehand by various simulations.

Other than this, the RAM 103 has the following variable areas.

(1) a variable area t for storing the time (real time) that elapses in the real world (2) a variable area u for storing the time (virtual time) that elapses in the virtual three-dimensional space (3) a variable area A for storing the interval at which the real time is discretized (4) a variable area B for storing the interval at which the virtual time is discretized (5) a buffer area (6) a VRAM (Video RAM) area (7) a flag area indicating whether or not the viewpoint and any of the objects will collide in future According to the present embodiment, in a case where the operations take place in so-called real time, t=u is established and the virtual time and the real time synchronize.

FIG. 3 is an explanatory diagram showing the relationship between the viewpoint and an object in the virtual time u in the virtual three-dimensional space. The following explanation will be given with reference to this diagram.

The viewpoint 301 is arranged at coordinates 302 c(u), and an object 311 is arranged at coordinates 312 r(u). The viewpoint 301 moves at a velocity of a vector 303 h(u), and the object 311 moves at a velocity of a vector 313 k(u).

The state that the objects including the object 311 arranged in the virtual three-dimensional space are observed from the viewpoint 301 along the direction of a sight line vector 304 d(u) is processed by three-dimensional graphics. The details of this process will be described later.

The object 311 is expressed by a polygon (polygon), and an outgoing normal vector 314 n(u) is set on the polygon. These pieces of information are each stored in the RAM 103 as described above, and updated where needed.

On the other hand, a velocity vector 322 v(u) representing the relative velocity between the object 311 and the viewpoint 301 can be calculated as v(u)=h(u)−k(u).

A displacement vector 321 m(u) representing the relative positional relationship between the object 311 and the viewpoint 301 can be calculated as m(u)=r(u)−c(u), provided that the coordinates 302 c(u) and the coordinates 312 r(u) are seen as vectors.

Figure 4:
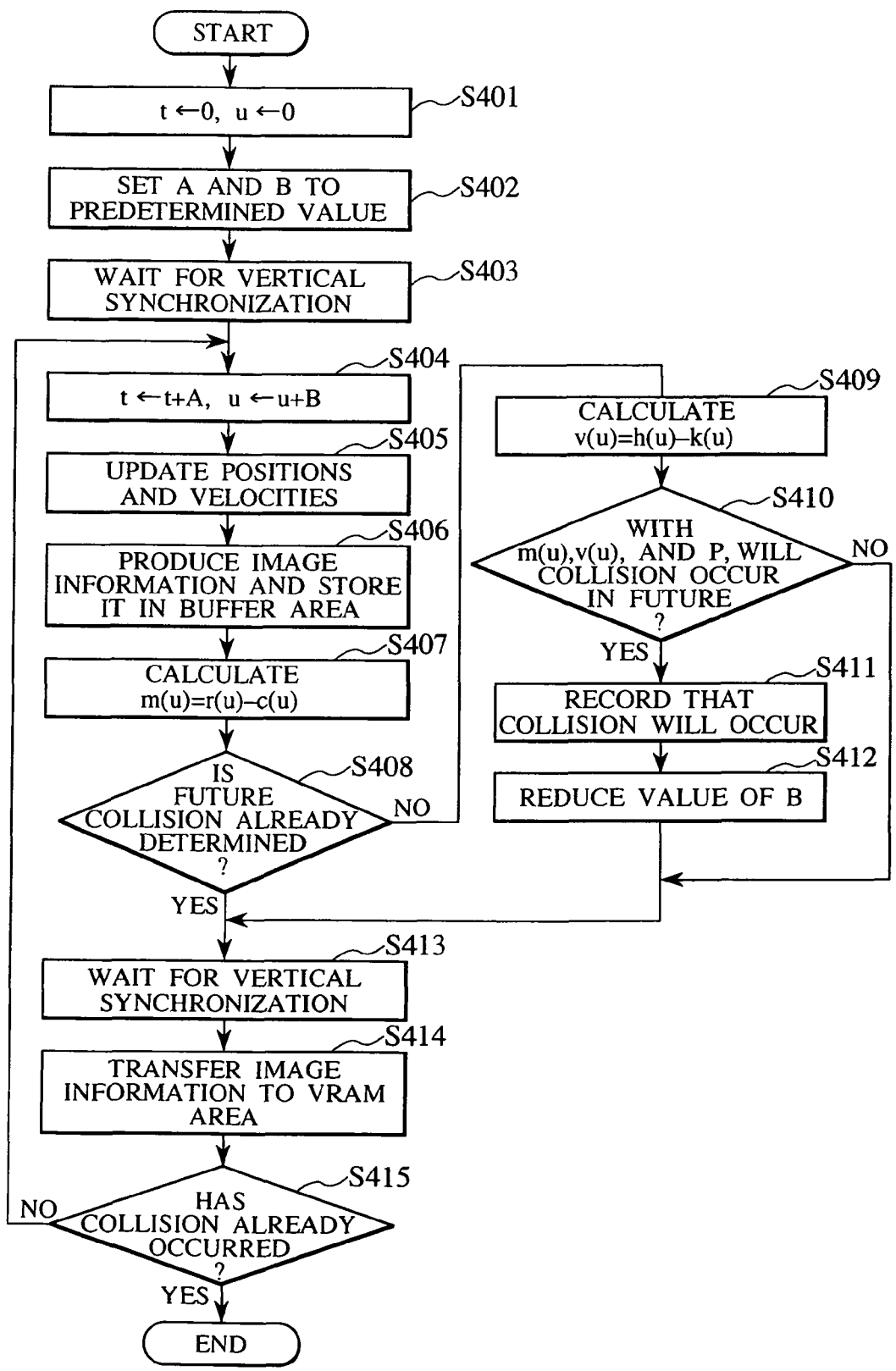
[FIG. 4] It is a flowchart showing the flow of control of a displaying method performed by the display.

FIG. 4 is a flowchart showing the flow of control of a displaying method 25 performed by the present display. The following explanation will be given with reference to this drawing.

When the displaying process of the display 201 according to the present embodiment is started, first, the variable t and the variable u are cleared (step S401), and the variable A and the variable B are both set to an interval at which a vertical synchronization interrupt occurs (step S402). Then, the occurrence of a vertical synchronization interrupt is waited (step S403).

A vertical synchronization interrupt is an interrupt for updating the screen display in the game device 100, and the image processing unit 107 reads out image information stored in the VRAM area and displays it on the monitor in synchronization with this interrupt. Since the transfer from the VRAM area to the monitor is performed in a co-routine in parallel with the main process, its indication is omitted in this drawing in order to facilitate understanding.

After a vertical synchronization interrupt occurs, the associating unit 203 updates the variable t and the variable u as follows (step S404).

$$t \leftarrow t+A;$$

$$u \leftarrow u+B$$

Thus, the CPU 101 functions as the associating unit 203 in cooperation with the RAM 103. During the initial phases after the present displaying process is started, since A=B is established as described above, the changes of the values of t and u coincide.

Next, the moving unit 204 performs the calculations to be described below with reference to the following values, etc. which are stored in the RAM 103 at the updated virtual time u, to update the values stored in the RAM 103 (step S405).

(1) the coordinates 302 c(u) of the viewpoint 301

(2) the vector 303 h(u) representing the moving velocity of the viewpoint 301

(3) the sight line vector 304 d(u)

(4) the coordinates 312 r(u) of the object 311

(5) the vector 313 k(u) representing the moving velocity of the object 311

(6) the normal vector 314 n(u) of the object 311

Calculations on these values can be performed by utilizing physical models of objects used in various three-dimensional graphics.

For example, since the discretizing interval (the difference from a virtual time immediately before) of the virtual time u is B as described above, it is possible to obtain the increment of the vector representing the moving velocity, by dividing the external force applied to the current object by the mass of the current object and multiplying the result by B. The vector representing the moving velocity can be updated by the increment. Further, it is possible to obtain the displacement of the object, by multiplying the average of the vector representing the moving velocity before updated and that after updated by B. The coordinates of the object can be updated by the displacement. Likewise, the normal vector can be updated from the relationship between the inertia moment of the object and the site to which the external force is applied.

In a case where the viewpoint 301 is set on any object, the movements and changes in posture of this object are reflected on the coordinates, vector representing the moving velocity, and sight line vector of the viewpoint 301.

In order to perform such calculations, the CPU 101 functions as the moving unit 204 in cooperation with the RAM 103.

Then, the display unit 205 produces image information representing the state of the virtual three-dimensional space as observed from the viewpoint 301 arranged at the coordinates 302 c(u) in the virtual three-dimensional space along the direction of the sight line vector 304 d(u), by using the above-described information stored in the RAM 103 and texture information for objects prepared separately, and stores the produced image information in the buffer area of the RAM 103 (step S406).

Thus, the image processing unit 107 controlled by the CPU 101 functions as the display unit 205 in cooperation with the RAM 103.

Then, the CPU 101 calculates the displacement vector 321 m(u) representing the relative positional relationship between the object 311 and the viewpoint 301 from the information stored in the RAM 103 according to $$m(u)=r(u)-c(u);$$

(step S407).

Further, the determination unit 206 checks whether or not a value showing that "a future collision is already determined" is stored in the flag area of the RAM 103 (step S408).

In a case where the value is not yet stored (step S408; No), i.e., in a case where it is unclear whether or not the viewpoint 301 and the object 311 will collide in future, the velocity vector 322 v(u) representing the relative velocity between the object 311 and the viewpoint 301 is calculated according to $$v(u)=h(u)-k(u)$$

(step S409).

Then, whether or not the viewpoint 301 and the object 311 will collide in future is determined from these values and a virtual threshold period P which is set beforehand (step S410).

The followings are considered as the method of determination.

(1) A method of making determination according to whether or not the viewpoint 301 will be positioned in the neighborhood of the object 311 when the virtual threshold period P will have elapsed from the current time. Specifically, it is a method of making determination according to
whether or not $$|m(u)-Pv(u)|\leq\epsilon$$

is satisfied, or
whether or not $$|m(u)-Pv(u)|^2\leq\epsilon^2$$

is satisfied, by using a constant ϵ for determining whether or not positioned in the neighborhood. Note that | | means an operation for calculating the size of the vector.

(2) A method of making determination according to whether or not the angle formed by the vector m(u) and the vector v(u) is included in a predetermined range near 0 degree, in addition to the above-indicated conditions. The angle formed by them can be calculated by $$\arc\cos[m(u)\cdot v(u)/(|m(u)||v(u)|)].$$

Here, · means the inner product of the vectors.

(3) A method of making determination by calculating the maximum acceleration assumed for the object 311 and the viewpoint 301 and calculating the ranges in which they can move in that case, and determining whether or not the ranges have any common portion. This method requires a large number of calculations, but can estimate whether a collision will occur or not with high accuracy.

In this manner, the CPU 101 functions as the determination unit 206 in cooperation with the RAM 103.

Then, in a case where it is determined that a collision will occur in future (step S410; Yes), this determination is recorded in the flag area in the RAM 103 (step S411), and the value stored in the variable area B is reduced (step S412). Typically, a preset constant D (D<A) is stored in the variable area B.

Therefore, in a case where it is determined that the viewpoint 301 and the object 311 will collide in the virtual three-dimensional space in future (until the virtual threshold period P will have elapsed from the current time), the virtual time u will pass slower than the real time t because the discretizing interval of u is reduced. Thereafter, the flow goes to step S413.

On the other hand, in a case where that a collision will occur is already stored in the flag area (step S408; Yes) or in a case where it is determined that no collision will occur (step S410; No), the flow goes to step S413.

Then, thereafter, the occurrence of a vertical synchronization interrupt is waited (step S413). Another process prepared separately may be performed in this waiting.

After a vertical synchronization interrupt occurs, the image information stored in the buffer area is transferred to the VRAM area (step S414). This is the so-called double buffering technique.

As described above, since the image information stored in the VRAM area is output to the monitor in synchronization with a vertical synchronization interrupt, animation display having no flicker becomes available by synchronizing the transfer to the VRAM area with a vertical synchronization interrupt.

Then, it. is checked whether the distance between the viewpoint 301 and the object 311 is smaller than a predetermined constant, i.e., whether or not the viewpoint 301 and the object 311 have collided (step S415). Specifically, with the use of a constant δ, it is possible to determine whether or not a collision has occurred, according to
whether or not $$|m(u)|<\delta$$

is satisfied, or
whether or not $$|m(u)|^2<\delta^2$$

is satisfied. It is preferred that the constant δ be adjusted to be smaller than the above-described constant ϵ.

Other than this, in a case where the viewpoint 301 moves together with a certain object (for example, a vehicle object), that "the viewpoint 301 and the object 311 have collided" at step S415 may be considered to be established when the object moving together with the viewpoint 301 collides with another object (for example, a wall object).

As a result of the check in this manner, in a case where the viewpoint 301 and the object 311 have collided (step S415; Yes), the process will be terminated. On the other hand, in a case where they have not collided (step S415; No), the flow returns to step S404.

After it is determined that a collision will occur, the animation display on the screen seems as if it were reproduced in slow motion until the collision actually occurs. By slowing down the elapse of time in the virtual three-dimensional space and making the screen display in slow-motion display, it is possible to notify to the user that it has been determined that the viewpoint will collide with the object in future.

In the explanation of the above-described process, in order to facilitate understanding, the explanation has been made with only one object 311 considered with respect to the viewpoint 301. However, since there are a plurality of objects 311 actually, it is necessary to make determinations appropriately for each of these. However, when it is determined that a collision with any of the objects 311 is determined, the slow-motion display will start from that time point.

Further, a value for discriminating whether or not to perform the collision determination may be assigned to the object 311 as its attribute and such a value may be stored in the RAM 103 for each object 311, so that the objects 311 for which the collision determination is performed may be selectable. For example, in a case where the present display 201 is applied to a racing game, it cannot generally be assumed that a vehicle object on which the viewpoint is set might collide with the road surface or a building arranged in a distance. Hence, the above-described determination process is performed only for those that might have a collision, by discriminating between objects that cannot have a collision, and such objects as building the wall of the course.

Embodiment 2

According to the above-described embodiment, slow-motion display is performed after it is determined that a collision will occur in future. According to the present embodiment, crossfading is performed in time with this.

For example, crossfading with a full black still image will make an animation display which combines slow motion and blackout, while crossfading with a full white sill image will make an animation display which combines slow motion and whiteout.

Other than this, in a case where the object is broken, gas or liquid is blown out from the object, or the object explodes when the collision occurs, crossfading with an animation image showing the state of these may be employed.

In case of performing crossfading, the blending ratio (also called "α value") between two images is calculated, so that the image saved in the buffer area and a predetermined still image or moving image may be α-blended.

The α value can be obtained in the following procedure. First, a variable area α for storing the α value secured in the RAM 103.

First, immediately after step S411, i.e., immediately after it is determined for the first time that a collision will occur, the variable area α is cleared to 0.

Meanwhile, in the "another process" at step S413, the variable area a in the RAM 103 is updated as $\alpha \leftarrow \alpha + B/P$.

With this, the value stored in the variable area a will gradually increase from 0 to 1 from when it is determined that a collision will occur until when the collision actually occurs.

Thereafter, simply, at step S414, the result obtained by blending the image saved in the buffer area and the predetermined still image or moving image at a blending ratio $(1-\alpha):\alpha$ is transferred to the VRAM area.

Generally, in a case where a collision is determined approximately, an irregular display such as polygon missing, etc. occurs when the viewpoint becomes close to an object.

According to the present embodiment, even in a situation where such an irregular display will highly probably occur, it is possible to make the user stay unaware of such an irregular situation, by smoothly shifting the screen display to blackout, whiteout, explosion animation, etc., without greatly complicating the calculations.

Embodiment 3

In the present embodiment, a case will be considered where the object that is considered to be going to collide with the viewpoint is stationary. For example, this is such a case where the viewpoint is set on a vehicle object, and whether or not the viewpoint will collide with an object representing a wall is considered.

In this case, it is determined that the viewpoint and the object will collide within the virtual threshold period, in a case where the route taken by the viewpoint within the virtual threshold period intersects the object, and at least any one of the following conditions (a) the angle formed by the normal vector and the sight line vector is included in a predetermined first range, (b) the angle formed by the sight line vector and the velocity vector is included in a predetermined second range, and (c) the angle formed by the velocity vector and the normal vector is included in a predetermined third range is satisfied.

Specifically, depending on the types and characters of simulations to which the embodiment is applied, any desired one of the seven patterns of (1) all of these three conditions are satisfied,
(2) only the conditions (a) and (b) are satisfied,
(3) only the conditions (b) and (c) are satisfied,
(4) only the conditions (c) and (a) are satisfied,
(5) only the condition (a) is satisfied,
(6) only the condition (b) is satisfied, and
(7) only the condition (c) is satisfied is employed.

For example, in a case where the angle formed by the sight line vector and the normal vector is close to 180 degrees and in a case where the sight line vector and the velocity vector are in almost the same direction (the formed angle is close to 0 degree), this corresponds to a situation that the viewpoint (or another object on which the viewpoint is set) and the object are to have a head-on collision. This is like only in this case, a "collision" is determined.

According to the present embodiment, how a collision occurs is predicted beforehand by providing such conditions as described above, so that it may be possible to appropriately select whether to perform slow-motion reproduction or to show how the collision occurs in the normal reproduction, according to the prediction.

Embodiment 4

In the present embodiment, after it is determined that a collision will occur, by displaying images by making the interval at which images are produced longer than that before it is determined that a collision occur, it is intended to give an effect like that of a stop motion to the animation display until before the collision occurs and notify to the user that a collision will occur in a simple manner.

Specifically, after it is determined that a collision will occur, production of image information into the buffer area and the transfer from the buffer area to the VRAM area are made to occur less frequently.

The less frequency method can be used by securing a new variable area s in the RAM 103.

Suppose that a constant parameter indicating a reduced frequency is E (E>A). The larger E is, the larger the interval becomes.

First, immediately after step S411, i.e., immediately after it is determined for the first time that a collision will occur, the variable area s is cleared to 0.

Further, at step S404, the variable area s is updated as s←s+A.

Further, the process of producing an image into the buffer area at step S406 and the process of transferring from the buffer area to the VRAM area at step S414 are performed only in a case where s≧E is established. In a case where these are performed, the variable area is updated as s←s−E, at between step S414 and step S415.

Other than this, as a method which likewise uses the variable area s, it is also possible to employ such one that sets s←t immediately after step S411, i.e., immediately after it is determined for the first time that a collision will occur, makes no update at step S404, and performs image production into the buffer area and the transfer to the VRAM area only in a case where t−s≧E is established, and in a case where these are performed, updates the variable area s as s←s+E at between step S414 and step S415.

As described above, by using stop motion, it is possible to greatly reduce the 15 amount of calculations of various kinds necessary for the screen display when a collision is in near future, and to use the calculation time of the CPU 101 for other processes.

The present application claims priority based on Japanese Patent Application No 2004-163825, the content of which is incorporated herein in its entirety.

INDUSTRIAL APPLICABILITY

As explained above, according to the present invention, it is possible to provide a display and a displaying method suitable for appropriately processing display in a case where it is expected, in three-dimensional graphics display, that a viewpoint will collide with an object, and a computer-readable information recording medium storing a program for realizing these on a computer, and the program, and to apply these to realizing a racing game or an action game in a game device, and to virtual reality techniques for providing virtual experiences of various types.

The invention claimed is:

1. A display, comprising:
a storage unit that stores coordinates of an object and a viewpoint arranged in a virtual three-dimensional space, and a sight line vector representing a sight line along which the virtual three-dimensional space is observed from the viewpoint;
an associating unit that associates a time in the virtual three-dimensional space, hereinafter referred to as virtual time, with a time in the real world, hereinafter referred to as real time, once in each predetermined update period;
a moving unit that obtains positions of the viewpoint and a sight line along which the virtual three-dimensional space is observed from the viewpoint in the virtual three-dimensional space at the associated virtual time, and updates the coordinates of the viewpoint and the sight line vector stored in said storage unit in accordance with a player's operations to a game controller;
a display unit that displays, once in said each predetermined update period, an image representing a state of the object as observed from the viewpoint along a direction of the sight line vector in the virtual three-dimensional space at the associated virtual time; and
a determination unit that determines whether or not a collision will occur between the viewpoint and the object before a threshold period in the virtual three-dimensional space elapses since a current time in the virtual three-dimensional space, hereinafter referred to as within a virtual threshold period, from the coordinates of the viewpoint, the coordinates of the object, and a velocity vector representing a relative velocity between the viewpoint and the object in the virtual three-dimensional space, wherein the collision has not previously occurred;
wherein the associating unit associates elapse of the virtual time with elapse of the real time such that they synchronize with each other until it is determined that the collision will occur between the viewpoint and the object within the virtual threshold period, and associates them such that the elapse of the virtual time is slower than the elapse of the real time and that the predetermined update period of the virtual time is reduced after it is determined that the collision will occur, said storage unit further stores a plurality of normal vectors, each of which is orthogonal to any one of the polygons forming an external surface of the object; and
in a case where the object is stationary in the virtual three-dimensional space, said determination unit determines that the collision will occur between the viewpoint and the object within the virtual threshold period in a case where:
a route taken by the viewpoint within the virtual threshold period intersects the object in the virtual three-dimensional space, and
at least any one of the following conditions:
(a) an angle formed by any one of the normal vectors and the sight line vector is included in a predetermined first range,
(b) an angle formed by the sight line vector and the velocity vector is included in a predetermined second range, or
(c) an angle formed by any one of the velocity vectors and the normal vector is included in a predetermined third range is satisfied.

2. The display according to claim 1, wherein said display unit displays the produced image and a predetermined moving image or a predetermined still image by crossfading them, after it is determined that the collision will occur.

3. The display according to claim 1, wherein after it is determined that the collision will occur, the display unit performs display by making an interval at which images to be displayed are produced longer than that before it is determined that the collision will occur.

4. A displaying method for a game device including an image processing unit and a storage unit comprising,
said storage unit storing coordinates of an object and a viewpoint arranged in a virtual three-dimensional space, a sight line vector representing a sight line along which the virtual three-dimensional space is observed from the viewpoint, and velocity vectors representing velocities at which the object and the viewpoint move in the virtual three-dimensional space, said displaying method comprising:

an associating step of associating a time in the virtual three-dimensional space, hereinafter referred to as virtual time, with a time in the real world, hereinafter referred to as real time, once in each predetermined update period with the image processing unit;

a moving step of obtaining positions of the object and the viewpoint and a sight line along which the virtual three-dimensional space is observed from the viewpoint in the virtual three-dimensional space at the associated virtual time, and updating the coordinates of the object and the viewpoint and the sight line vector stored in said storage unit in accordance with a player's operations to a game controller, with the image processing unit;

a displaying step of displaying, once in said each update period, an image representing a state of the object as observed from the viewpoint along a direction of the sight line vector in the virtual three-dimensional space at the associated virtual time with the image processing unit; and a determining step of determining whether or not a collision will occur between the viewpoint and the object before a threshold period in the virtual three-dimensional space elapses since a current time in the virtual three-dimensional space, hereinafter referred to as within a virtual threshold period, from the coordinates of the viewpoint, the coordinates of the object, and a velocity vector representing a relative velocity between the viewpoint and the object in the virtual three-dimensional space with the image processing unit, wherein the collision has not previously occurred;

wherein at said associating step, elapse of the virtual time and elapse of the real time are associated such that they synchronize with each other until it is determined that the collision will occur between the viewpoint and the object with in the virtual threshold period, and they are associated such that the elapse of the virtual time is slower than the elapse of the real time and that the predetermined update period of the virtual time is reduced after it is determined that the collision will occur with the image processing unit, said storage unit further stores a plurality of normal vectors, each of which is orthogonal to any one of the polygons forming an external surface of the object; and in a case where the object is stationary in the virtual three-dimensional space, at said determination step it is determined that the collision will occur between the viewpoint and the object within the virtual threshold period in a case where:

a route taken by the viewpoint within the virtual threshold period intersects the object in the virtual three-dimensional space, and at least any one of the following conditions:

(a) an angle formed by any one of the normal vectors and the sight line vector is included in a predetermined first range as determined with the image processing unit, (b) an angle formed by the sight line vector and the velocity vector is included in a predetermined second range as determined with the image processing unit, or (c) an angle formed by any one of the velocity vectors and the normal vector is included in a predetermined third range is satisfied as determined with the image processing unit.

5. A computer-readable information recording medium which stores a program for controlling a computer to function as:

a storage unit that stores coordinates of an object and a viewpoint arranged in a virtual three-dimensional space, a sight line vector representing a sight line along which the virtual three-dimensional space is observed from the viewpoint, and velocity vectors representing velocities at which the object and the viewpoint move in the virtual three-dimensional space;

an associating unit that associates a time in the virtual three-dimensional space, hereinafter referred to as virtual time, with a time in the real world, hereinafter referred to as real time, once in each predetermined update period;

a moving unit that obtains positions of the object and the viewpoint and a sight line along which the virtual three-dimensional space is observed from the viewpoint in the virtual three-dimensional space at the associated virtual time, and updates the coordinates of the object and the viewpoint, and the sight line vector stored in said storage unit in accordance with a layer's operations to a game controller;

a display unit that displays, once in each said predetermined update period, an image representing a state of the object as observed from the viewpoint along a direction of the sight line vector in the virtual three-dimensional space at the associated virtual time; and a determination unit that determines whether or not a collision will occur between the viewpoint and the object before a threshold period in the virtual three-dimensional space elapses since a current time in the virtual three-dimensional space, hereinafter referred to as within a virtual threshold period, from the coordinates of the viewpoint, the coordinates of the object, and a velocity vector representing a relative velocity between the viewpoint and the object in the virtual three-dimensional space, wherein the collision has not previously occurred;

wherein in said computer, the associating unit associates elapse of the virtual time with elapse of the real time such that they synchronize with each other until it is determined that the collision will occur between the viewpoint and the object within the virtual threshold period, and associates them such that the elapse of the virtual time is slower than the elapse of the real time and that the predetermined update period of the virtual time is reduced after it is determined that the collision will occur, said storage unit further stores a plurality of normal vectors, each of which is orthogonal to any one of the polygons forming an external surface of the object; and in a case where the object is stationary in the virtual three-dimensional space, said determination unit determines that the viewpoint and the object will collide within the virtual threshold period in a case where:

a route taken by the viewpoint within the virtual threshold period intersects the object in the virtual three-dimensional space, and:

at least any one of the following conditions (a) an angle formed by any one of the normal vectors and the sight line vector is included in a predetermined first range, (b) an angle formed by the sight line vector and the velocity vector is included in a predetermined second range, or (c) an angle formed by any one of the velocity vectors and the normal vector is included in a predetermined third range is satisfied.

* * * * *